US006400462B1

(12) United States Patent
Hille

(10) Patent No.: US 6,400,462 B1
(45) Date of Patent: Jun. 4, 2002

(54) SERVICE TOOL FOR SERVICING PRINTERS

(75) Inventor: David G. Hille, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/187,518

(22) Filed: Nov. 6, 1998

(51) Int. Cl.[7] .......................... G06F 13/00

(52) U.S. Cl. .......................... 358/1.14; 358/468; 399/8; 399/9; 399/18; 399/81

(58) Field of Search .......................... 358/1.1, 1.5, 1.12, 358/1.13, 1.14, 1.15, 1.16, 400, 401, 403, 407, 468; 399/8, 9, 10, 11, 13, 18, 19, 36, 37, 81, 82

(56) References Cited

U.S. PATENT DOCUMENTS 5,243,382 A * 9/1993 Takano et al. .................. 399/8
5,822,221 A * 10/1998 Groenteman .................. 399/8
6,009,284 A * 12/1999 Weinberger et al. ........... 399/8
6,061,603 A * 5/2000 Papadopoulos et al. ....... 700/83

OTHER PUBLICATIONS

Lasertest NX60 Operators Manual, Nov. 18, 1996.*
*Lasertest NX60 Operator's Manual*, available from Laser Wizard, Valley Forge Business Center, 705 General Washington Avenue, Ste 202, Northtown PA 19403–3683., pp. 1–19.
*Lasertest SX30 Operator's Instruction Manual*, available from Laser Wizard, 705 General Washington Avenue, Ste 202, Northtown PA 19403–3683., pp. 1–9, App. B.
*LBP–NX PCB Service Manual*, available from Canon, Inc., 30–2 Shimomaruko 3–chome, Ohta–ku, Tokyo 146, Japan, 1993, pp. 6–4 through 6–9.

* cited by examiner

*Primary Examiner*—Mark Wallerson

(57) ABSTRACT

A printer service tool includes a control panel port connector for connecting to the control panel port of a printer, a controller diagnostic port connector for connecting to a diagnostic port of the printer, and a display. The display displays a plurality of menus. A first menu includes a representation of buttons displayed on a control panel of the printer. A second menu includes menu items which provides ability to monitor printer functionality.

21 Claims, 16 Drawing Sheets

SERVICE TOOL FOR SERVICING PRINTERS

BACKGROUND

The present invention concerns printers and pertains particularly to a service tool used to service printers.

While laser printers manufactured by Hewlett-Packard Company have proved to be extremely reliable, there is the occasional need for a printer to be serviced. When a printer malfunctions, typically service personnel use a digital multimeter and their past experience to determine the cause of the problem. Diagnosing a problem often includes swapping out multiple parts in an effort to discover the source of the problem. This type of service relies heavily on the skill of the service personnel. The haphazard nature of such diagnosis can lead to increased material and labor costs due to misdiagnosis of problems.

A Laser Driver Checker tool developed by Canon USA Inc., having a business address of 2051 Mission College Blvd., Santa Clara, Calif. 95054-1566, interfaces to a diagnostic port on a DC controller within printers. However, the service tool provides no testing of the printer formatter or control panel of the printer. Further, the service tool was designed for Canon factory use, specifically for internal manufacturing purposes. The service tool is expensive and does not decode failure information automatically. The user must interpret LED flashes to know what the printer engine failure is.

The Lasertest NX60 test tool, available from Laser Wizard, having a business address of Valley Forge Business Center, 705 General Washington Avenue, Ste 202, Northtown Pa. 19403-3683, interfaces to the DC controller diagnostic port and the control panel port of a printer. This first module is a test tool for a printer engine manufactured by Canon, Inc. The Lasertest NX60 test tool is a second module which gives the first module the capability to test the HP LaserJet IIISI printer and the HP LaserJet 4Si printer available from Hewlett-Packard Company, having a business address of 3000 Hanover Street, Palo Alto, Calif. 94304. Thus to interface to an HP LaserJet IIISI printer or an HP LaserJet 4Si printer, two separate modules are connected together to create a single test tool. This combination is very confusing because the descriptions for the buttons on the first module refer to a printer engine which is different than the printer engine utilized by the HP IIISI printer and the HP LaserJet 4Si printer. The user must look at a drawing located on the second module in order to interpret what the buttons on the first module do when testing a HP LaserJet IIISI or a HP LaserJet 4Si printer. The test tool utilizes a single 1×16 character display to show information. The result is that it is confusing and hard to use without training. The connector for the diagnostic port on the DC Controller has all of its electrical leads exposed, which could cause additional harm to the printer.

SUMMARY OF THE INVENTION

In accordance with the preferred embodiment of the present invention, a printer service tool is presented. The printer service tool includes a control panel port connector for connecting to the control panel port of a printer, a controller diagnostic port connector for connecting to a diagnostic port of the printer, and a display. The display displays a plurality of menus. A first menu includes a representation of buttons displayed on a control panel of the printer. A second menu includes menu items which provides ability to monitor printer functionality.

For example, the second menu includes menu items from an engine test menu. Alternatively, the second menu includes menu items which allow selection of a paper path through the printer, or the second menu includes an indication of the fuser temperature for the printer. In another the menu can include a representation of buttons displayed on a control panel of a second type of printer.

In a preferred embodiment of the present invention, the printer service tool includes a port connector for connecting the printer service tool to an external computing device. The printer service tool transfers to the external computing device, through the port connector, service information obtained from the printer.

In one embodiment, software, running on the external computing system, receives current contents of a control panel display of the printer as part of the service information and displays detailed information about any messages and errors indicated by the current contents of the control panel display. The detailed information includes, for example, information about any failure in printer operation and includes a suggested fix. The software also can include a web browser to be used for display the detailed information as well as updating the detailed information from a remote web site.

In the preferred embodiment, the printer service tool implements macros selected by a user of the printer service tool. For example, when the user selects a first macro to be performed at start-up of the printer, the printer service tool, upon detecting start-up of the printer, simulates button presses on a control panel for the printer. This is done by the printer service tool setting button values for the control panel, and holding the button values for a predetermined amount of time. For example, the first macro places the printer into a service mode or into an extended diagnostics mode.

The present invention provides an easy way to diagnose and troubleshoot printers. The printer service tool reduces repair labor costs and material costs and allows service personnel to accurately diagnose and identify the failing field replaceable unit (FRU) within the printer.

The printer service tool may be manufactured at a low cost and is easy to use, requiring little or no training to operate printer service tool. Simple menus are displayed on a graphical display, which also contribute to user friendliness. The macros allow single button access into the printer service mode or extended diagnostic mode. Errors captured from the engine diagnostic port are automatically decoded, displayed and described in text on the graphical display of printer service tool, also contributing to the convenience of the user.

The software interface is very useful because it automatically interprets numeric failure messages displayed by the control panel and uses an integrated web browser to provide a detailed description of the failure as well as a suggested fix. Previously this information was not decoded and the user would manually look the information up in a service manual. Also, in the preferred embodiment, the software is designed in a modular fashion using HTML files so that fix/failure information can be updated over time by simply downloading the latest HTML files from a remote web site. This prevents the user from having to download the entire program each time a file is updated. In addition to the features mentioned above the software also has the same functionality as the test tool menus. The printer service tool allows the user to move between test menus while displaying DC-Controller failure messages, formatter error messages, high voltage drive signals, and the printer display all at the same time. This gives the user the advantage of seeing the failure information while continuing to exercise the printer in an attempt to determine the cause of the failure.

DESCRIPTION OF THE PREFERRED EMBODIMENT

Figure 1:
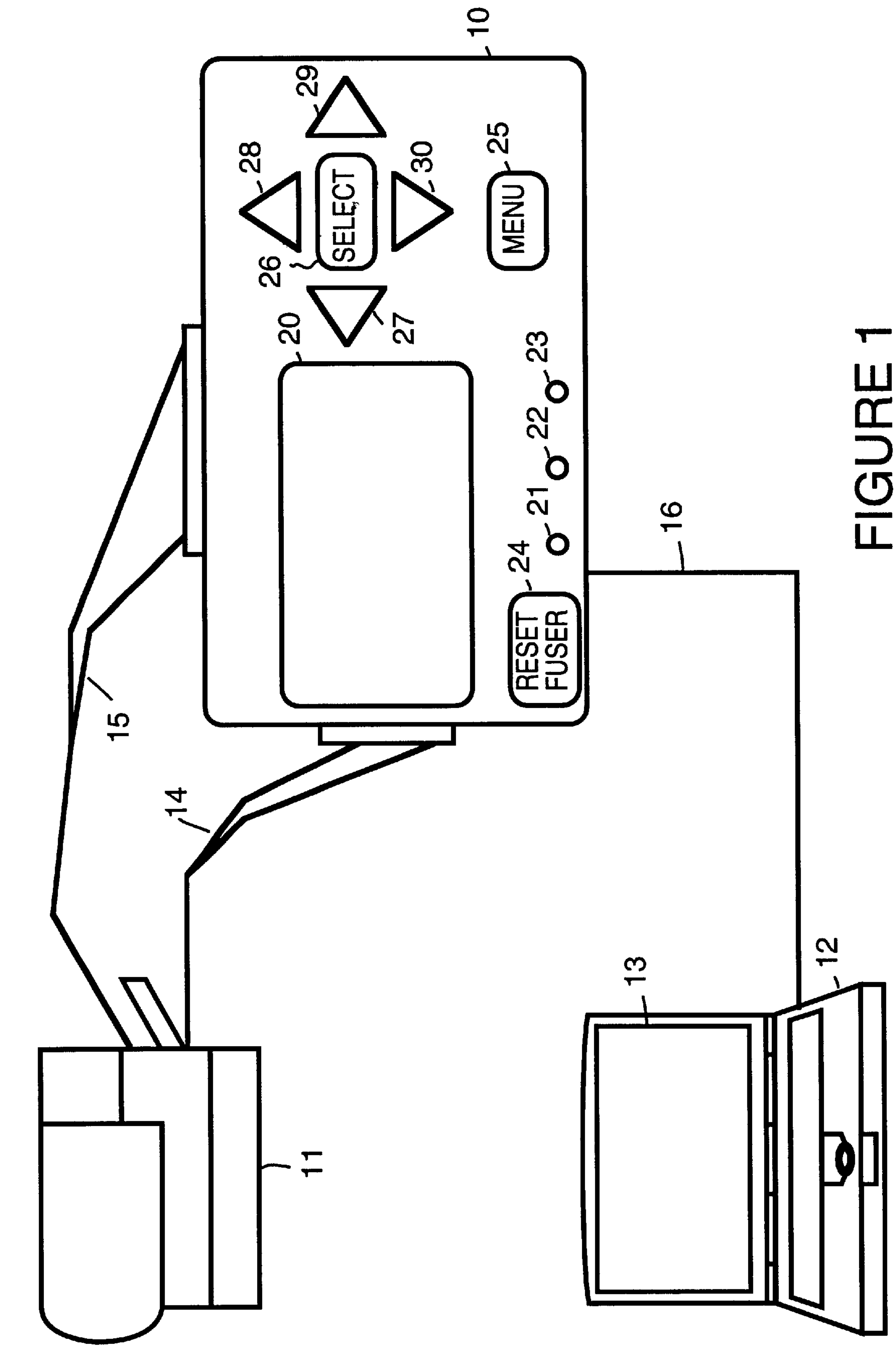
FIG. 1 shows a printer service tool connected to a printer in accordance with a preferred embodiment of the present invention.

FIG. 1 shows a printer service tool 10 connected to a printer 11. Printer service tool 10 also can be connected, through an RS232 compatible link 16, to a portable computer 12. Printer service tool 10 is a handheld test tool. The user interface for printer service tool 10 is menu driven. A 128×64 pixel graphical display 20 is used to display information.

Printer service tool 10 connects to the printer engine of printer 11 via a cable 14 connected to the diagnostic port found on the DC controller for printer 11. Printer service tool 10 also connects to the control panel port on the formatter of printer 11 via a cable 15. This gives printer service tool 10 the ability to control and monitor the printer engine as well as test the formatter and control panel of printer 11.

Printer service tool 10 is housed in a 5.75"×0.81"×3.60" plastic enclosure. A reset fuser button 24 is used to reset the fuser in printer 11 after an error has occurred. A light emitting diode (LED) 21 is lit when printer service tool 10 detects the 5 volt power source of printer 11 is functioning properly. An LED 22 is lit when printer service tool 10 detects the 12 volt power source of printer 11 is functioning properly. An LED 23 is lit when printer service tool 10 detects the 24 volt power source of printer 11 is functioning properly.

A menu button 25 is used to select the menu that appears on display 20. A directional arrow 27, a directional arrow 28, a directional arrow 29 and a directional arrow 30 are used to highlight buttons displayed within display 20. A select button 26 is used to select the currently highlighted button within display 20.

Figure 2:
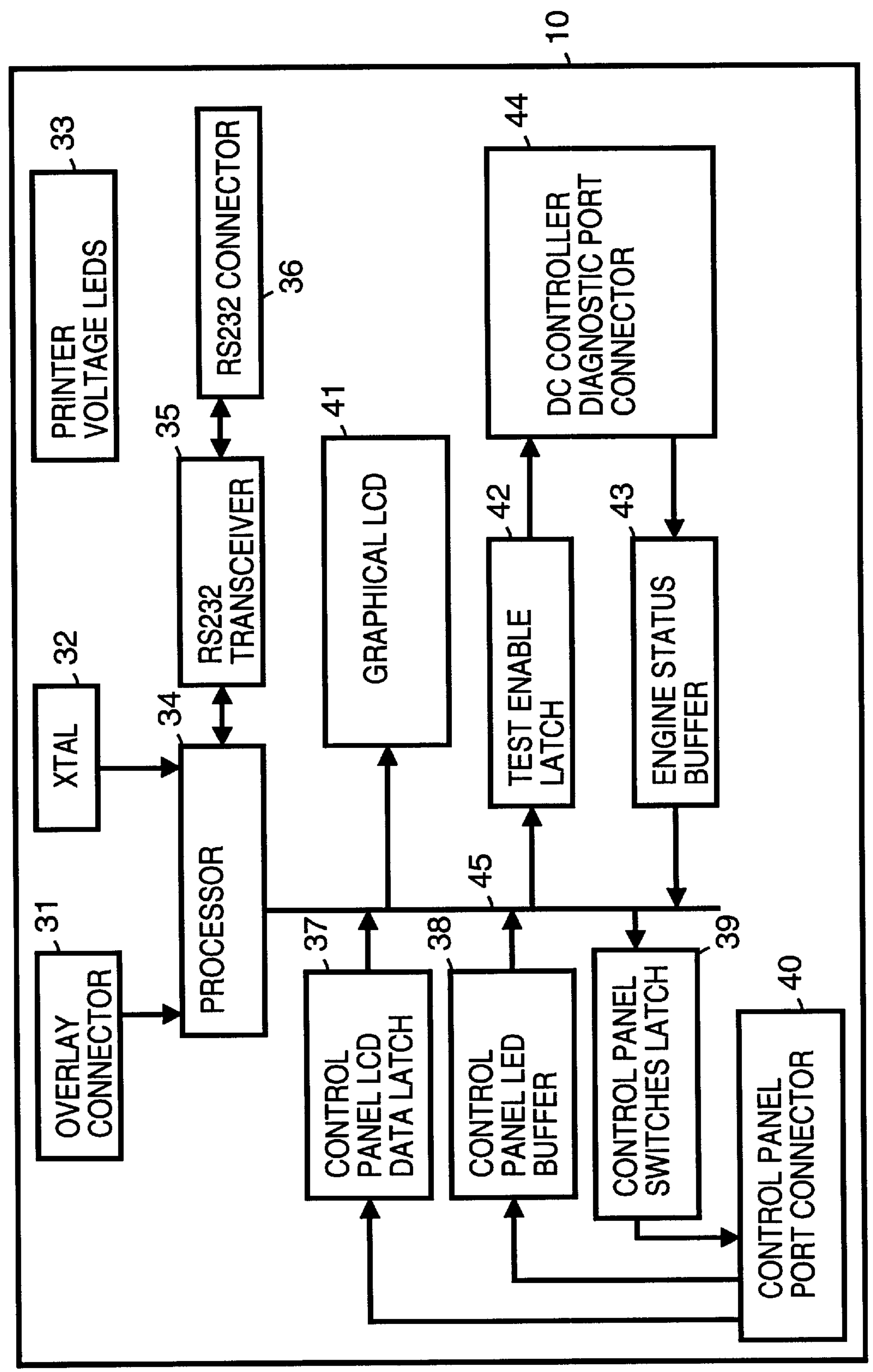
FIG. 2 shows a hardware block diagram of the printer service tool shown in FIG. 1 in accordance with a preferred embodiment of the present invention.

FIG. 2 shows a hardware block diagram of printer service tool 10. A processor 34 is, for example, a PIC16C74A microprocessor available from Microchip Technology Inc., having a business address of 2107 N 1st Street Number 590, San Jose, Calif. 95131-2027. An 8-bit bus 45 allows processor 34 to communicate to a graphical LCD controller 41, a test enable latch 42, an engine status buffer 43, a control panel LCD data latch 37, a control panel LED buffer 38 and a control panel switches latch 39. Test enable latch 42 and engine status buffer 43 provide an interface to a DC controller diagnostic port connector 44. Control panel LCD data latch 37, control panel LED buffer 38 and control panel switches latch 39 provide an interface to control panel port connector 40.

Control panel LCD data latch 37 and control panel switches latch 39 capture control panel LCD Data and set control panel switch values. This data comes from the control panel port of printer 11. This allows printer service tool 10 to emulate the control panels of printer 11 as well as read the contents of the printer display of printer 11. Control panel LED buffer 38 puts on bus 45 the values of the LEDs of printer 11 when a request comes from processor 34.

Test enable latch 42 enables different tests and settings in the printer engine of printer 11. Engine status buffer 43 is used to read error messages sent from the DC Controller of printer 11. Engine status buffer 43 is also used to read internal drive signals sent to the high voltage power supply within printer 11.

Processor 34 acts as the bus arbitrator, controlling which device is on the bus and when. An overlay connector 31 provides an interface between processor 34 and the switches and LEDs shown in FIG. 1. An RS232 transceiver 35 converts +13V, −13V RS232 signals to TTL. Combined with a UART within processor 34, RS232 transceiver 35 and an RS232 connector 36 allow printer service tool 10 to communicate with portable computer 12. Print voltages LEDs include LEDs 21, 22 and 23, shown in FIG. 1. A crystal (Xtal) 32 is a crystal oscillator which provides a clock signal to processor 34.

Printer service tool 10 utilizes a combination of a factory diagnostic test port, located on the DC Controller of printer 11, and the control panel port of printer 11, to gain low level accessibility to the printer engine and formatter of printer 11. This low level access allows printer 11 to be placed into ready inhibit mode (a special mode used for troubleshooting that allows printer 11 to operate in the presence of non-fatal errors) as well as to control of the different subassemblies within printer 11. Printer service tool 10 also displays the status of printer sensors, voltages, control signals, and additional failure information presented by the DC Controller.

Figure 3:
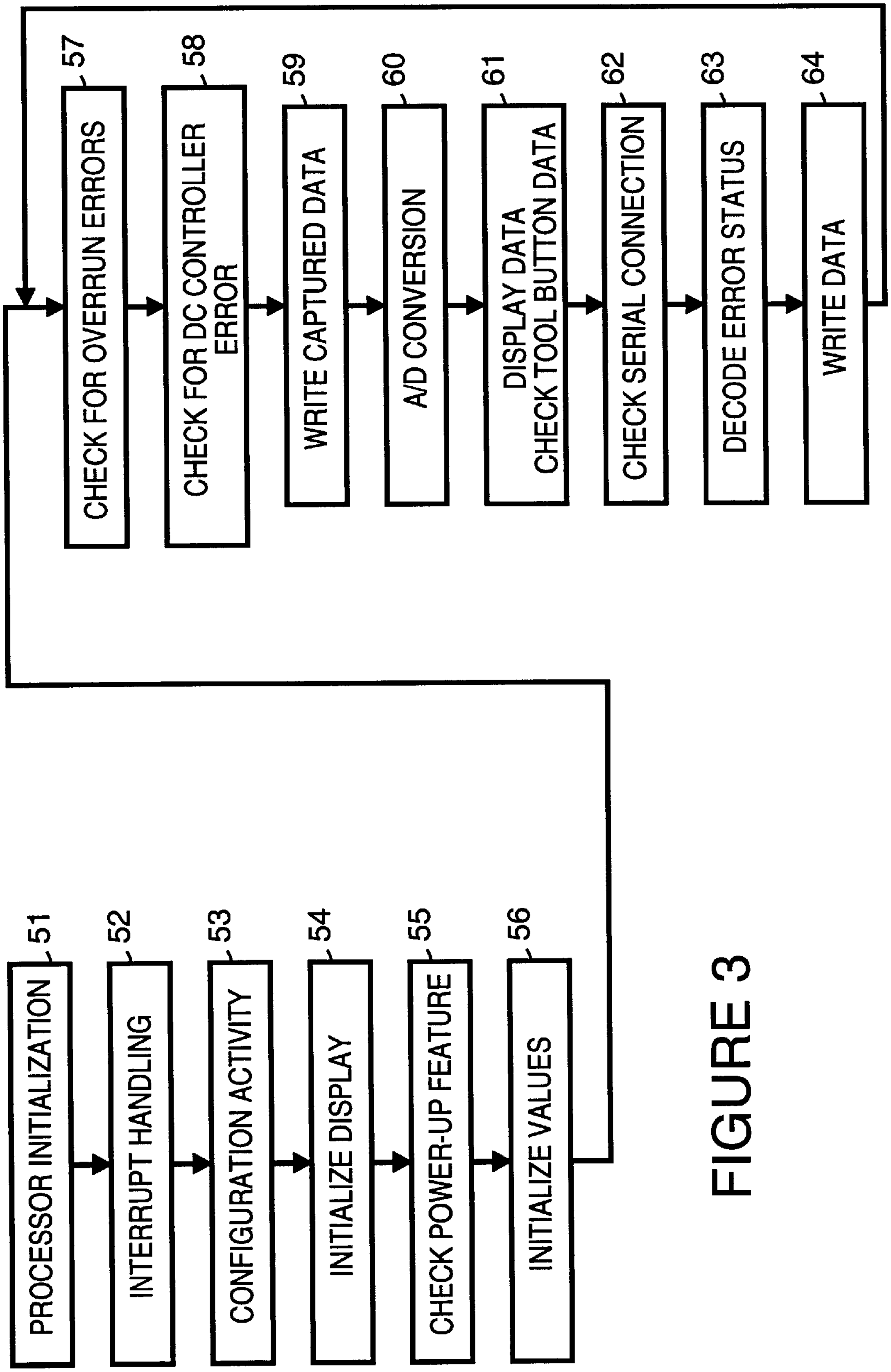
FIG. 3 is a simplified flowchart of firmware executed by processor a processor within the printer service tool shown in FIG. 1 in accordance with a preferred embodiment of the present invention.

FIG. 3 is a simplified flowchart of firmware executed by processor 34. The firmware resides in processor 34 and provides all the logic and intelligence needed for printer service tool 10 to operate properly.

During power on of processor 34, the firmware does all necessary initializations of processor 34 and printer service tool 10. As shown in FIG. 3, in a step 51, processor 34 is initialized. In step 51, variable declarations are performed and the functionality of processor 34 is set.

In a step 52, an interrupt handler is initialized to capture instructions and data sent from the formatter of printer 11 to the control panel display of printer 11. The interrupt handler is used to capture data and instructions that would normally be sent to the control panel display of printer 11. This routine allows the control panel display messages to be displayed on graphical display 20 of printer service tool 10. If a portable computer is attached to printer service tool 10, the PC service tool software that resides on the portable computer can also have access to the control panel display messages.

In a step 53 various configuration activity is performed. Variable values are set. Watch dog timer (WDT) is enabled. WDT resets processor 34 when processor 34 enters an unknown or looping state. The timer is powered up and detection of brown out is initialized. Analog-to-digital (A/D) conversion, timers and interrupts are configured. The input/output (I/O) of processor 34 is also configured.

In a step 54, graphical display 20 is initialized.

In a step 55, a determination is made as to whether a power-up feature has been enabled. The power up features are events that must occur during power on of printer 11. For example the service mode, extended diagnostic mode, and ready inhibit are entered during power up of printer 11. If processor 34 senses that one of these events are enabled it immediately applies the proper signals to printer 11 as printer 11 is powering up. This feature, implemented by macros, is discussed in greater detail below.

In a step 56, all hardware latch values, all menu vectors and all menu flag registers are initialized.

After completion of step 56, processor 34 and printer service tool 10 has been initialized. The firmware then enters the main routine, beginning in a step 57. The main routine is sequential and runs in a continuous loop. The firmware controls what content is written to graphical display 20 and defines how the menus will look and operate.

Printer errors are detected, decoded, and displayed. Specifically, in step 57, overrun errors on the UART (within processor 34) are checked. In a step 58, a check is made to see if DC controller in printer 11 has indicated that there is an error in the printer engine. If so, the error value and a written explanation of the error is written to graphical display 20.

In a step 59, display data captured by interrupt handler code is written to graphical display 20 of printer service tool 10.

In a step 60, analog-to-digital (AID) conversion is performed on all analog signals. These include analog-to-digital conversions of the fuser temperature and laser output power.

All switches on the overlay of printer service tool 10 are monitored and if any are pressed, execution of the firmware breaks off into the necessary event handler. Specifically, in a step 61, test port data and control panel data are retrieved. The appropriate values are then written to graphical display 20 of printer service tool 10. Additionally, tool switch data are sampled (i.e., determine when a button on printer service tool 10 has been pressed) and any required actions are taken.

In a step 62 a check is made to determine if a serial connection has been established to a portable computer. If a serial connection has been established, the menu on graphical display 20 of printer service tool 10 is blanked and the serial port connected to the portable computer is monitored for communication from the PC service tool software running on portable computer 12. Printer service tool 10 has the ability to communicate all information received from printer 11 to software residing on portable computer 12, through serial link 16. This information includes the control panel display contents obtained from printer 11. Using the control panel display contents, the PC service tool software on portable computer 12 decodes numeric failure messages and provide detailed fix/failure information. In a step 63, the error status of the DC controller is decoded.

In a step 64, printer service tool 10 writes data to the control panel of printer 11 and to the test port latches of printer 11.

The PC service tool software located in portable computer 12 is an optional user interface. The PC service tool software provides all the functionality of printer service tool 10 as well as the ability to provide additional failure/fix information by giving further information regarding the numeric failure messages found on the display of the printer control panel. The PC service tool software is capable of displaying all the menus on printer service tool 10. Printer service tool 10 can operate as a standalone unit, while operation of the PC service tool software requires that portable computer 12 is connected to printer service tool 10. Within the PC service tool software is a search engine, which allows the user look for display messages and errors. Also included is a manual showing how printer service tool 10 operates.

The PC service tool software also integrates a web browser, such as the Internet Explorer Web Browser available from Microsoft Corporation, having a business address at 16011 NE 36th Way, Redmond, Wash. 98073-9717. After a connection between the PC service tool software and printer service tool 10, the PC service tool software reads the control panel display of printer 11. The contents of the display are compared with a list of possible display messages. If a match is found, the PC service tool software points the integrated web browser to the corresponding HTML pages that describe the printer error as well as provide fix information. The HTML files are stored locally on portable computer 11, but can be periodically updated from information stored on the internet.

Figure 4:
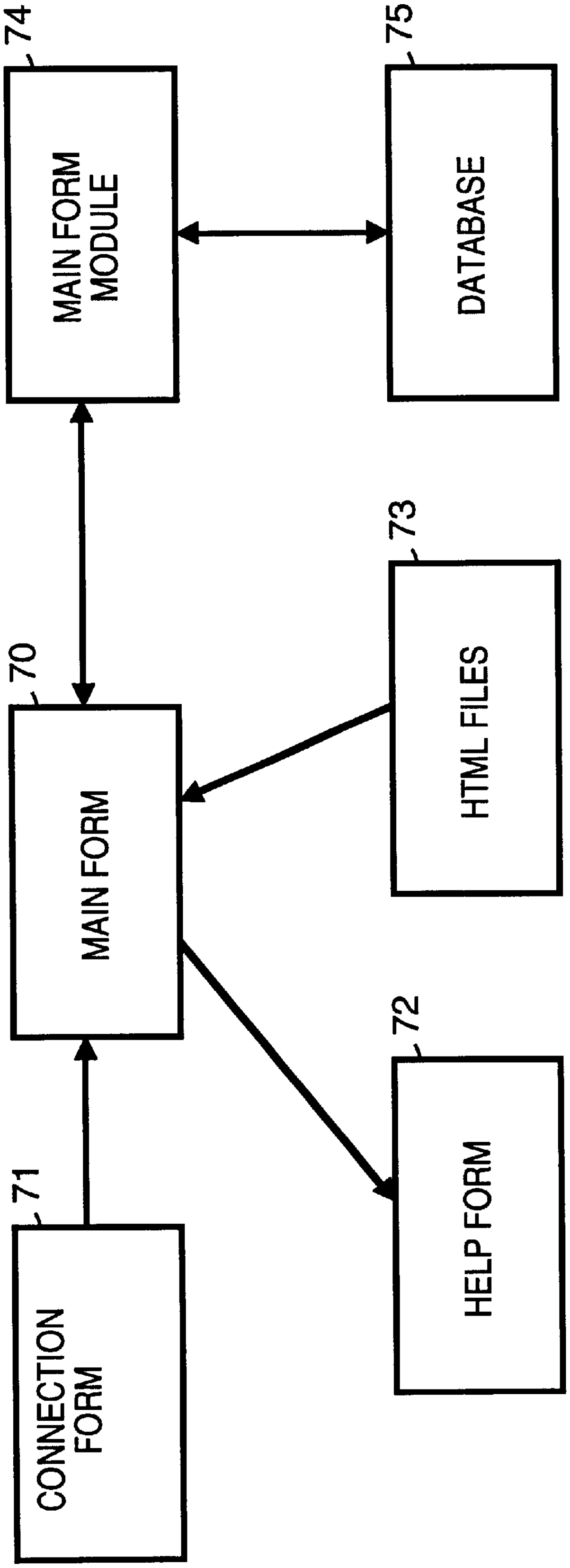
FIG. 4 shows a block diagram of PC service tool software which works with the printer service tool shown in FIG. 1 in accordance with a preferred embodiment of the present invention.

FIG. 4 shows a block diagram of the PC service tool software on portable computer 12. The PC service tool software includes a main form 70, a connection form 71, a help form 72, HTML files 73, a main form module 74 and a database 75.

Main form 70 includes a web (HTML) browser, performs monitoring and processes commands. Main form 70 also includes a serial communication module. Connection form 71 handles the connection to printer service tool 10. Connection form 71 includes a connection wizard which helps the user connect portable computer 12 to printer service tool 10 and establish communication between the PC service tool software and printer service tool 10. The connection wizard allows the user to set the communication (COM) port for the serial communication and also will reconnect printer service tool 10 to the PC service tool software if printer 11 is powered off or becomes disconnected.

Help form 72 includes a manual for printer service tool 10 and a list of all possible messages from printer 11. HTML files 73 contains fix/failure information. Main form module 74 contains global variable declarations for the PC service tool software, as well as a search engine for display messages. Database 75 is a data base of control panel messages and errors.

The integrated web browser within main form 70 is used to display information. All the HTML files 73 which store fix/failure information in HTML format are held in a specific directory of portable computer 12. This allows the fix/failure information to be updated as new fixes and failures are discovered without the user having to download a new version of the entire program.

The PC service tool software provides detailed fix/failure information by reading the contents of the control panel display of printer 11. The PC service tool software decodes numeric failure messages that appear on the control panel display and provides specific failure/fix information in written form. Both messages and errors are compared with known messages and errors within database 75. Once a match is found the PC service tool software uses the integrated web browser to read HTML files stored locally on the system in HTML files 73. HTML files 73 contain detailed information about the failure and also provide a suggested fix. The PC service tool software is in a modular fashion so that the PC service tool software can be updated with new fix/failure information by downloading the latest HTML files off of the web.

Figure 5:
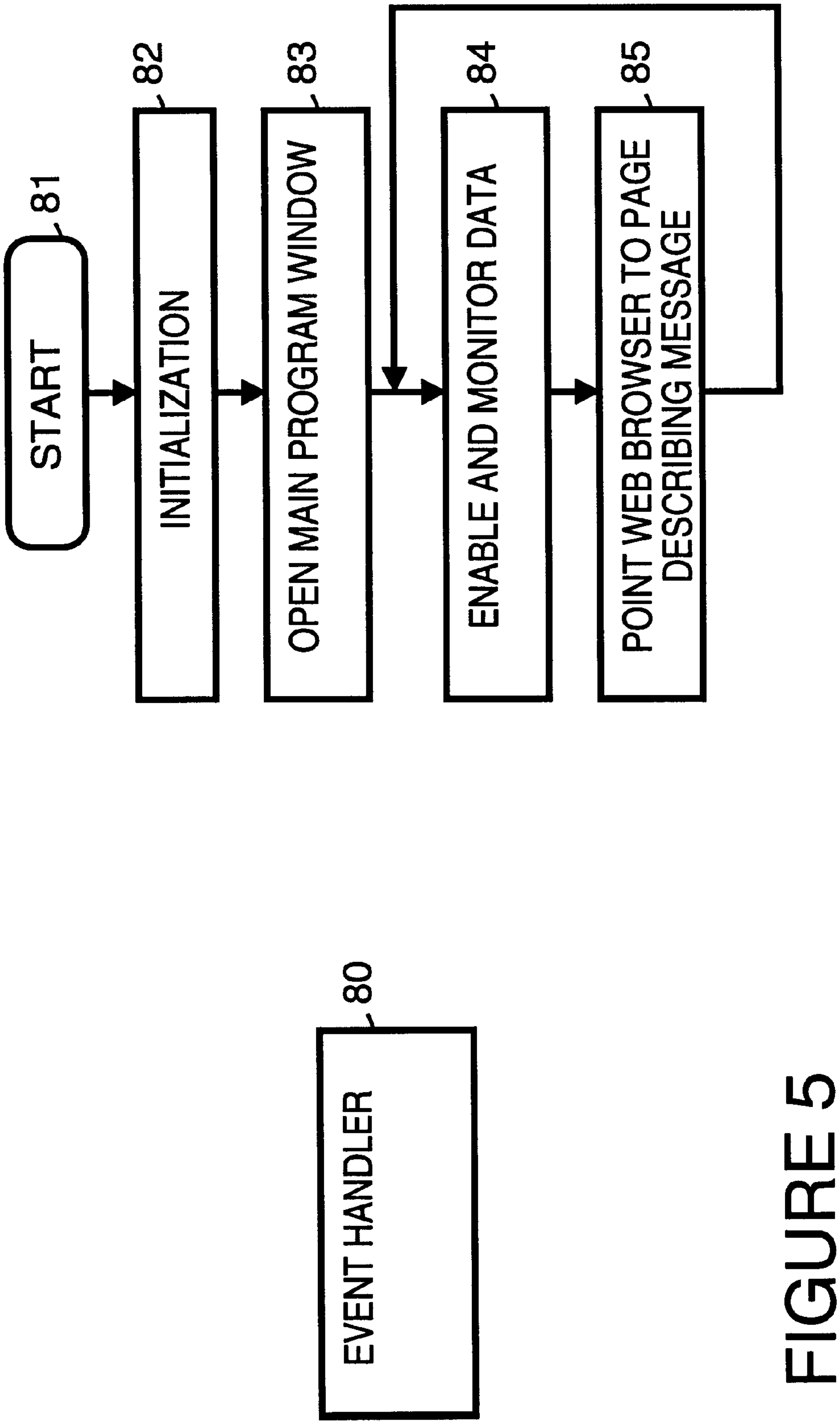
FIG. 5 is a flowchart which illustrates the flow of the PC service tool software in accordance with a preferred embodiment of the present invention.

FIG. 5 is a flowchart which illustrates the flow of the PC service tool software. The PC service tool software is started in a step 81. In a step 82, the PC service tool software initializes communication with printer service tool 10. The PC service tool software also provides communication port settings and connection help.

In a step 83, once communication is established between printer service tool 10 and portable computer 12, the PC service tool software closes the connection wizard (in connection form 71) and opens the main window (controlled by main form 70).

In a step 84, once the main window is opened, the software monitors the control panel display, control panel LED's, engine error status, high voltage power supply drive signals, fuser temperature, and laser output power of printer 11. The PC service tool software also runs selected tests and emulates the control panel functionality of printer 11.

In a step 85 (and step 84), the PC service tool software continuously compares the current control panel display message with a list of known messages and errors and in step 85 provides the appropriate information once a match has been found. An event handler 80 reacts to events such as buttons in printer 11 being selected.

Figure 6:
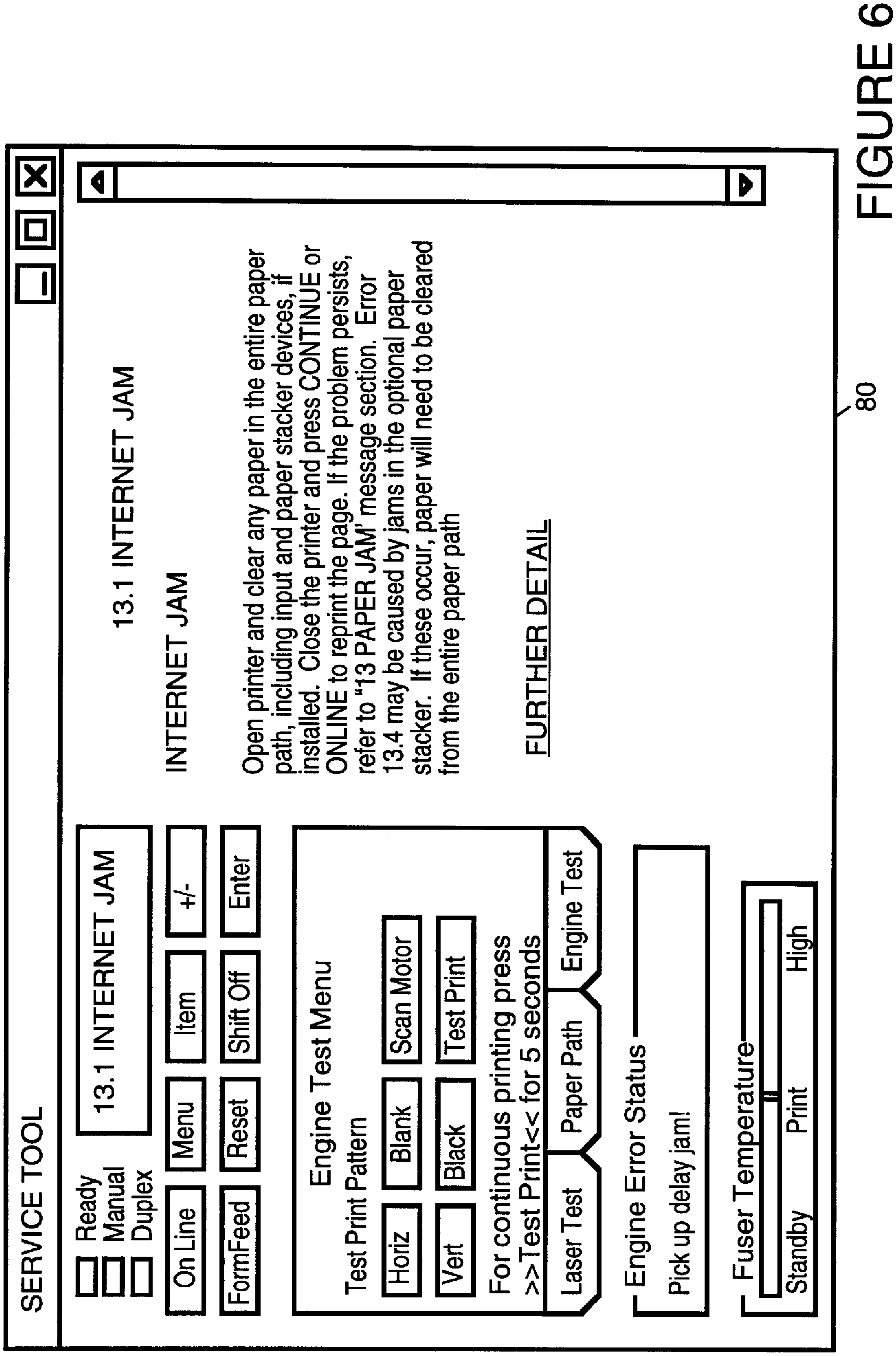
FIG. 6 shows a simplified example of a window displayed by the PC service tool software in accordance with a preferred embodiment of the present invention.

FIG. 6 shows a simplified example of window 80 displayed by the PC service tool software within personal computer 12.

Figure 7:
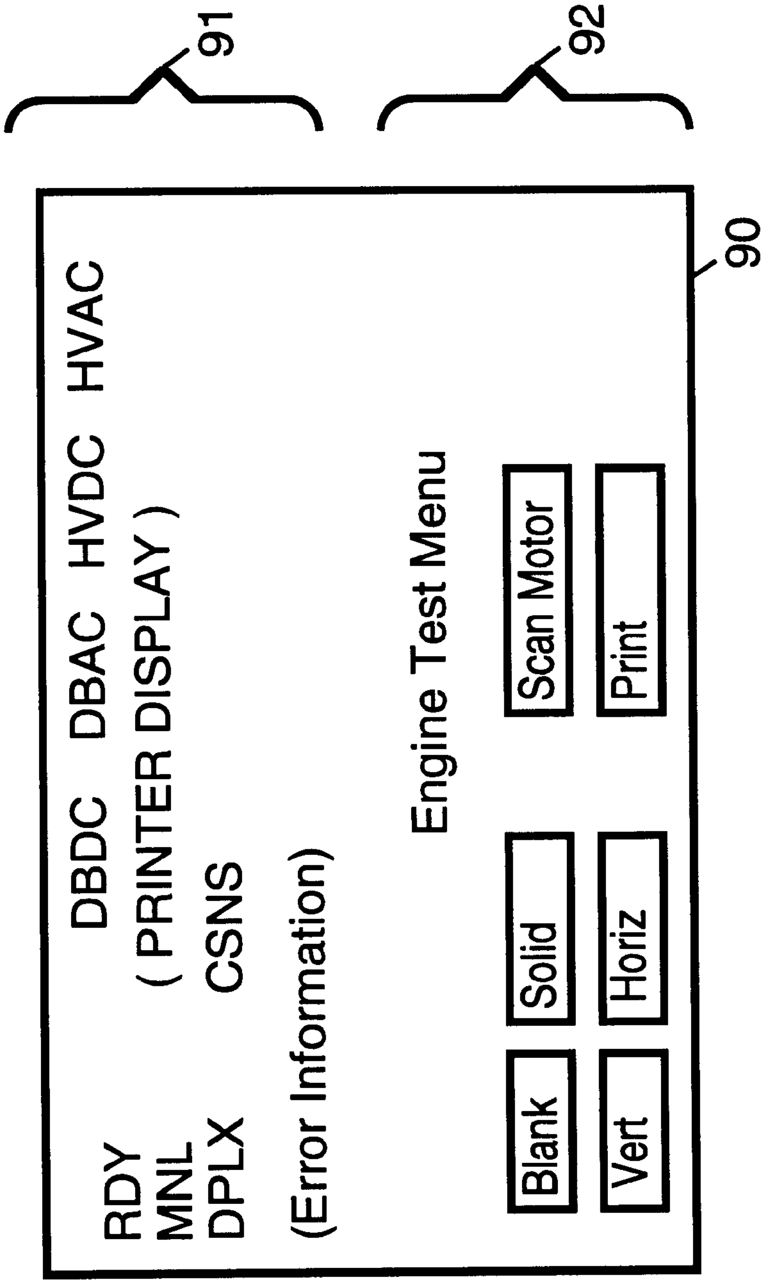
FIG. 7 shows an engine test menu displayed by the printer service tool shown in FIG. 1 in accordance with a preferred embodiment of the present invention.

At power-on, printer service tool 10 displays an engine test menu 90, shown in FIG. 7. Engine test menu 90 includes a menu display portion 91, common to all the menus of printer service tool 10, and a menu display portion 92, which includes special menu items from the engine test menu.

In menu display portion 91, the contents of the control panel display LCD for printer 11 is shown (This is represented in FIG. 7 by the text "Printer display"). The PC service tool firmware decodes numeric failure messages that appear on the control panel display and provides specific failure information in written form (This is represented in FIG. 7 by the text "Error Information"). Service tool 10 displays the entry "RDY" when the "ready" LED light of printer 11 is on. Service tool 10 displays the entry "MNL" when the "manual" LED light of printer 11 is on. Service tool 10 displays the entry "DPLX" when the "duplex" LED light of printer 11 is on. The entries "DBDC", "DBAC", "HVDCC" and "HVAC" are displayed with the associated sampled high voltage signals are present. Service tool 10 displays the entry "CSNS" when the cartridge sensitivity sensor senses that a printer cartridge is present in printer 11.

In order to access menu items in the menu display portion 92, a user presses directional arrow 27, directional arrow 28, directional arrow 29 and/or directional arrow 30 (shown in FIG. 1) to highlight any of the special menu items from engine test menu 90. Upon the user pushing select button 26 (shown in FIG. 1) the highlighted item is selected.

Figure 8:
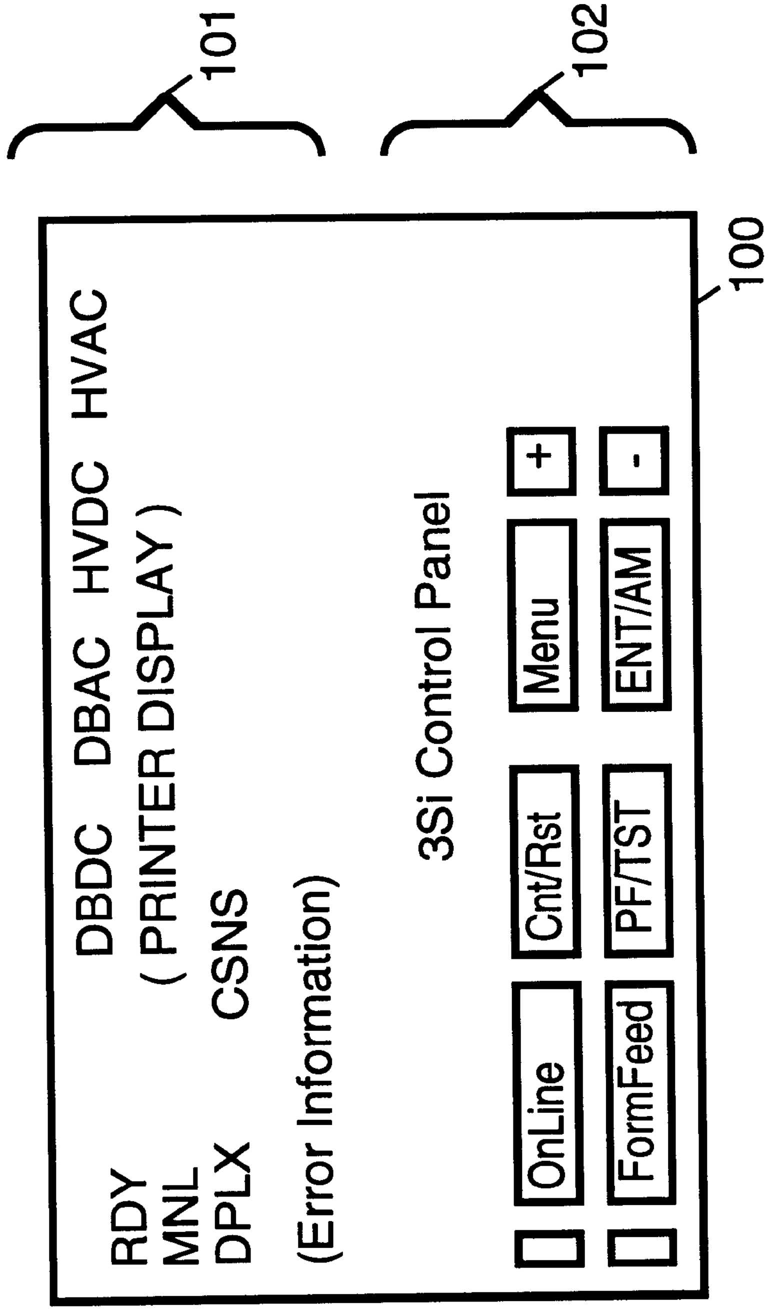
FIG. 8 shows a printer control panel menu displayed by the printer service tool shown in FIG. 1 in accordance with a preferred embodiment of the present invention.

The user can change menus by pressing menu button 25 (shown in FIG. 1). For example, as shown in FIG. 8, a 3Si control panel menu 100 includes a menu display portion 101, common to all the menus of printer service tool 10, and a menu display portion 102, which includes the menu items normally displayed on the control panel of a Hewlett-Packard 3Si laser printer. A user presses directional arrow 27, directional arrow 28, directional arrow 29 and/or directional arrow 30 (shown in FIG. 1) to highlight any of the menu items on control panel menu 100. Upon the user pushing select button 26 (shown in FIG. 1) the highlighted item is selected.

Figure 9:
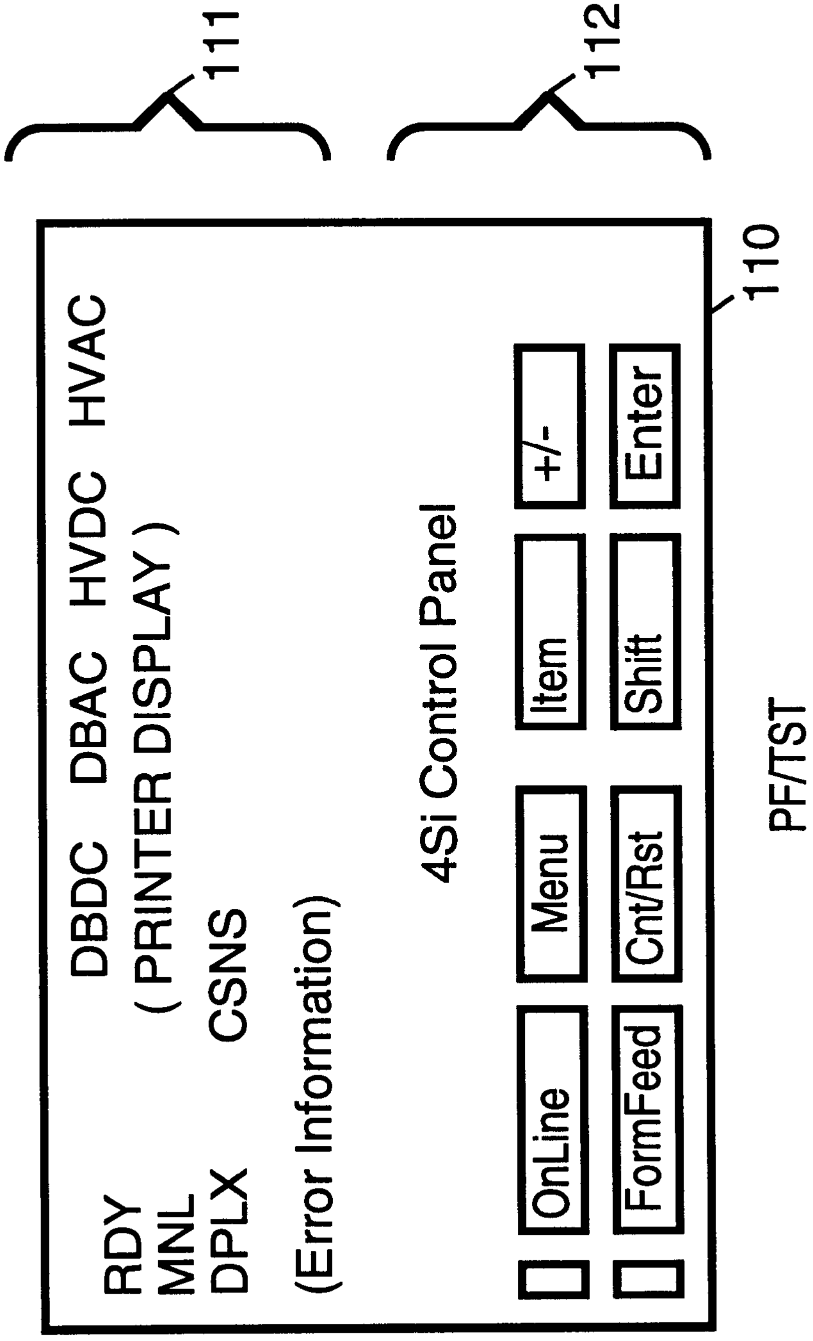
FIG. 9 shows another printer control panel menu displayed by the printer service tool shown in FIG. 1 in accordance with a preferred embodiment of the present invention.

As shown in FIG. 9, a 4Si control panel menu 110 includes a menu display portion 111, common to all the menus of printer service tool 10, and a menu display portion 112, which includes the menu items normally displayed on the control panel of a Hewlett-Packard 4Si laser printer. A user presses directional arrow 27, directional arrow 28, directional arrow 29 and/or directional arrow 30 (shown in FIG. 1) to highlight any of the menu items on control panel menu 110. Upon the user pushing select button 26 (shown in FIG. 1) the highlighted item is selected.

Figure 10:
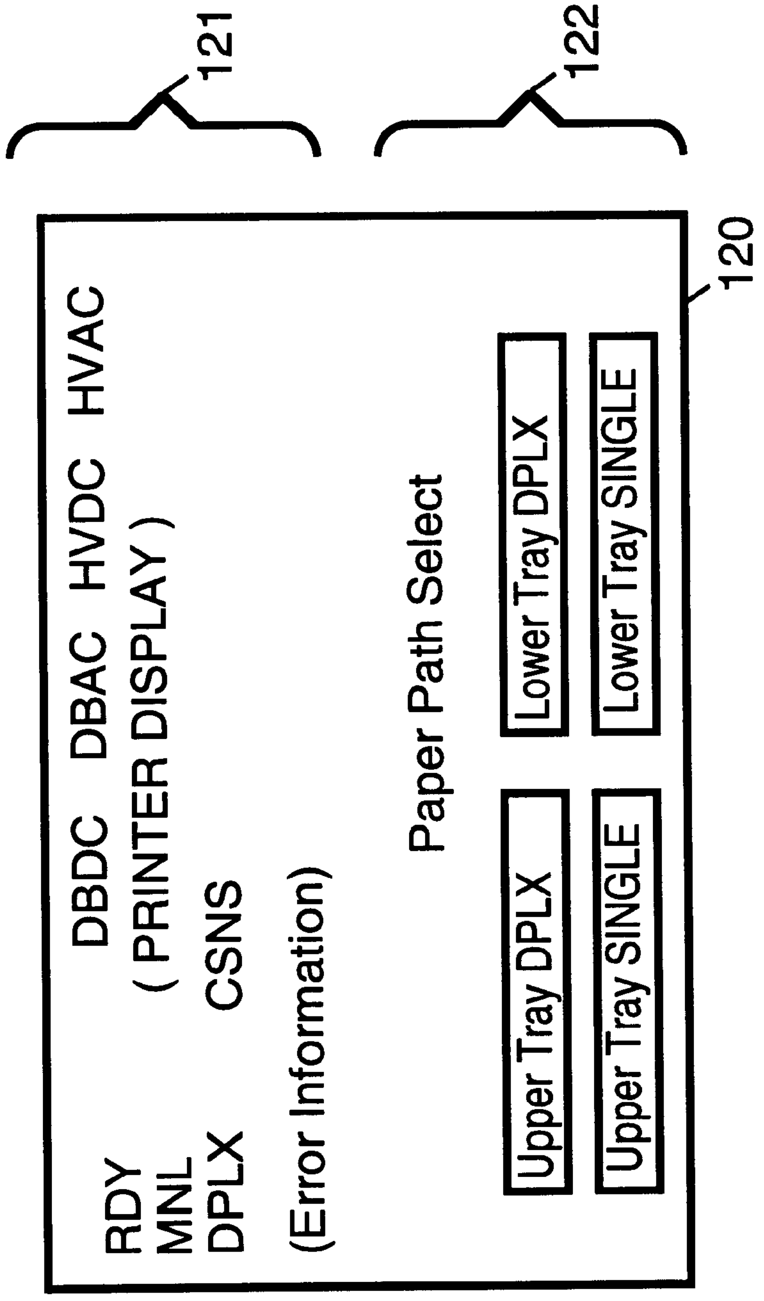
FIG. 10 shows a paper path select menu displayed by the printer service tool shown in FIG. 1 in accordance with a preferred embodiment of the present invention.

As shown in FIG. 10, a paper path select menu 120 includes a menu display portion 121, common to all the menus of printer service tool 10, and a menu display portion 122, which includes paper path select menu items. A user presses directional arrow 27, directional arrow 28, directional arrow 29 and/or directional arrow 30 (shown in FIG. 1) to highlight any of the menu items on paper path select menu 120. Upon the user pushing select button 26 (shown in FIG. 1) the highlighted item is selected.

Figure 11:
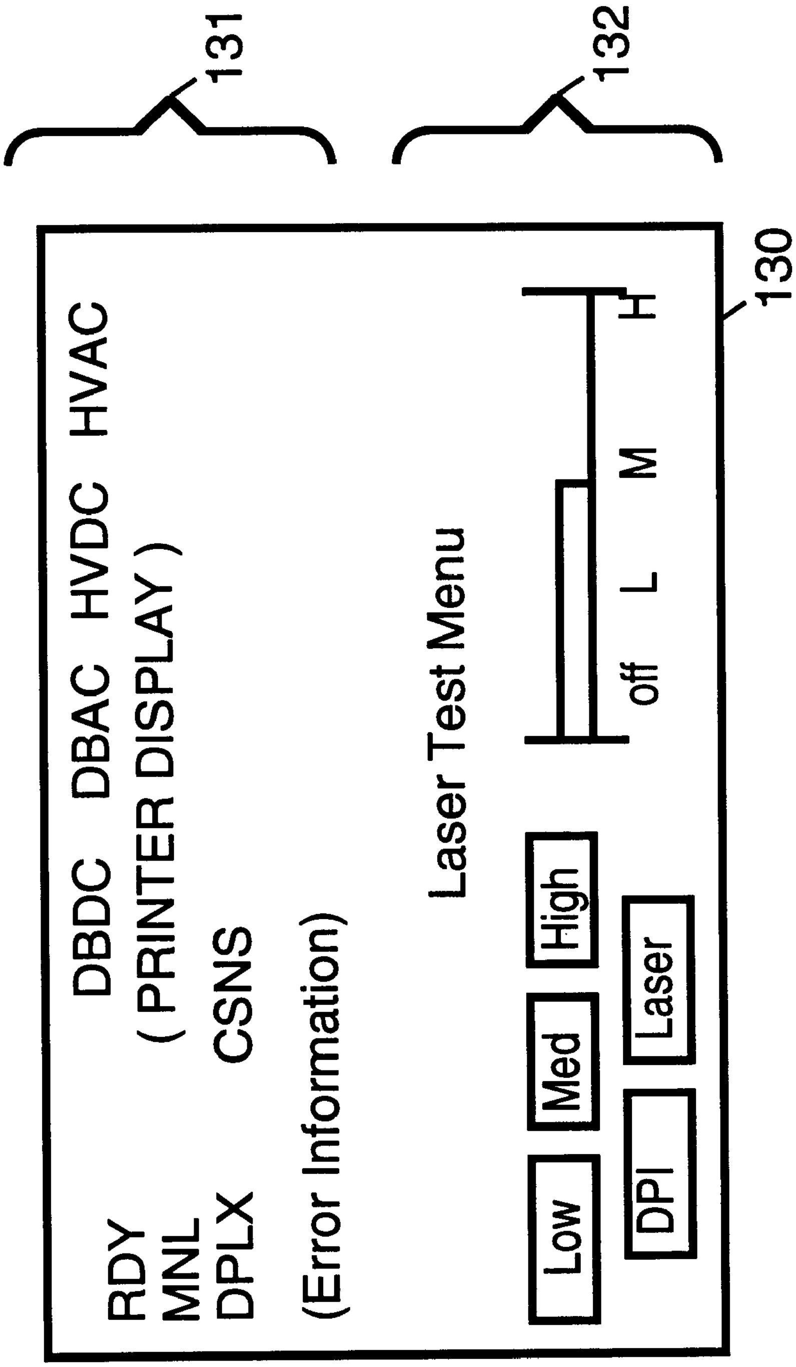
FIG. 11 shows a laser test menu displayed by the printer service tool shown in FIG. 1 in accordance with a preferred embodiment of the present invention.

As shown in FIG. 11, a laser test menu 130 includes a menu display portion 131, common to all the menus of printer service tool 10, and a menu display portion 132, which includes laser test menu items and a bar graph showing laser output power. A user presses directional arrow 27, directional arrow 28, directional arrow 29 and/or directional arrow 30 (shown in FIG. 1) to highlight any of the menu items on laser test menu 130. Upon the user pushing select button 26 (shown in FIG. 1) the highlighted item is selected.

Figure 12:
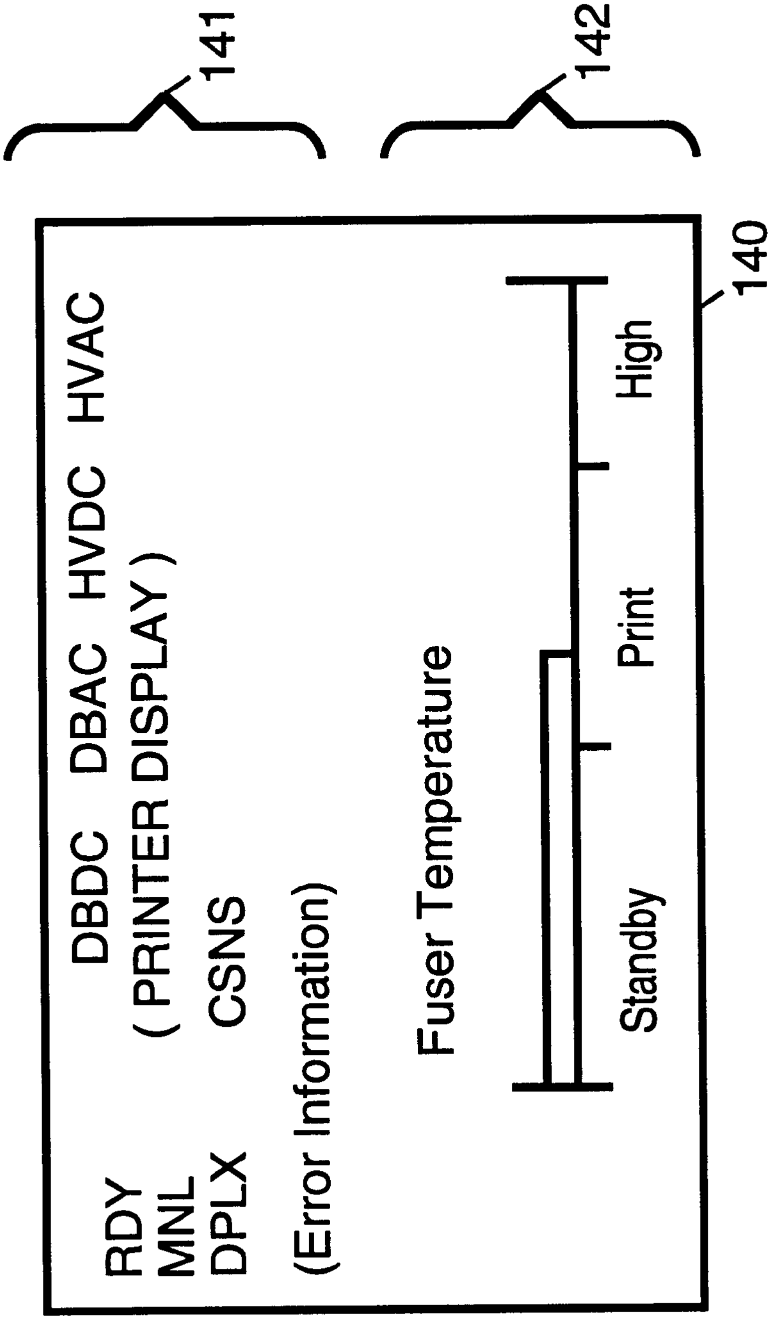
FIG. 12 shows a fuser temperature display menu displayed by the printer service tool shown in FIG. 1 in accordance with a preferred embodiment of the present invention.

As shown in FIG. 12, a fuser temperature display menu 140 includes a menu display portion 141, common to all the menus of printer service tool 10, and a menu display portion 142, which includes a bar graph indicating fuser temperature.

Printer service tool 10 uses macros to put printer 11 into different modes. Normally these modes are initiated by pressing special key sequences on the printer control panel while printer 11 is being powered on. Printer service tool 10 simulates this by sensing at power on of printer 11 whether a user is selecting one of the macros. If printer service tool 10 senses at power on of printer 11 that a user is selecting one of the macros, printer service tool will simulate button presses on the printer control panel by setting button values and then calling a timer to hold these values for the required amount of time. This is repeated for each button sequence.

Figure 13:
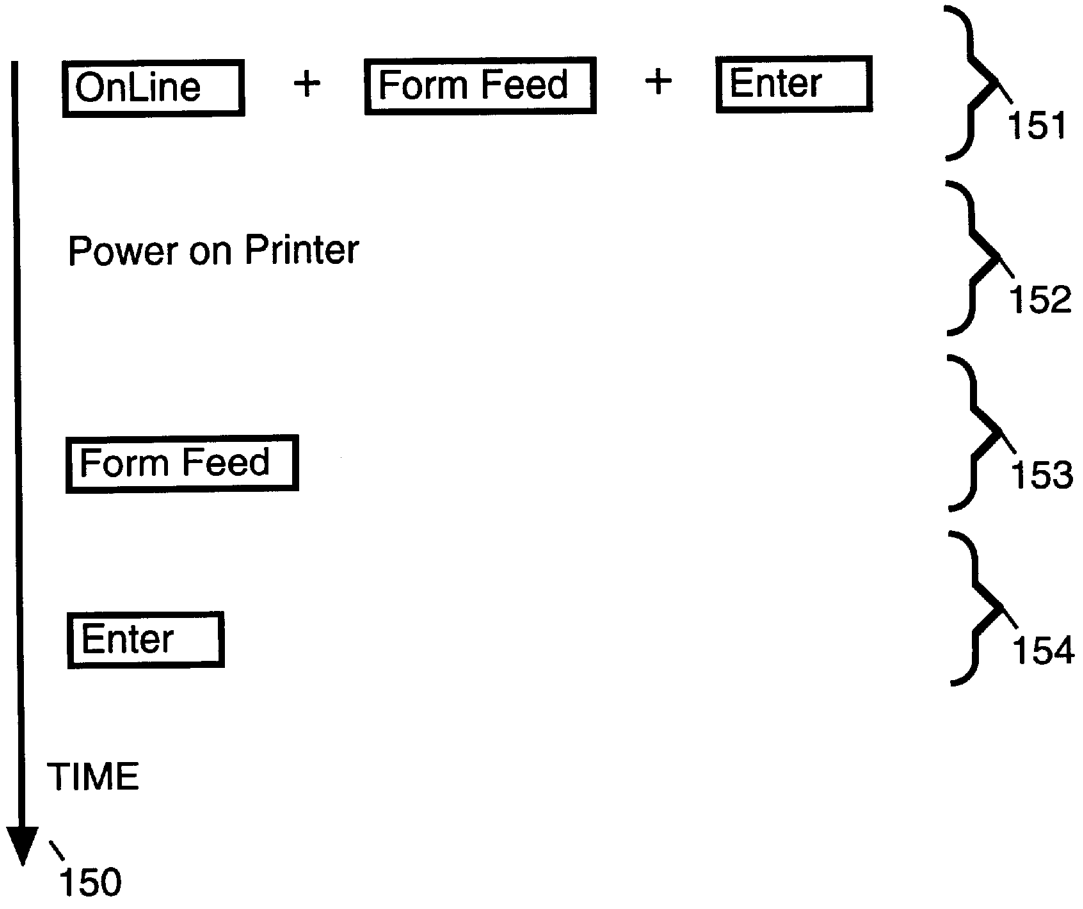
FIG. 13 shows the button sequence used to place a Hewlett-Packard 4Si laser printer into service mode.

For example, FIG. 13 shows the button sequence used to place a Hewlett-Packard 4Si laser printer into service mode. Elapsing of time is represented by an arrow 150. Provided printer 11 is a Hewlett-Packard 4Si laser printer, the button sequence may be used to place printer 11 into service mode. In a time 151, before printer 11 is turned on, the user presses and holds the OnLine button, the FormFeed button and the Enter button on the control panel of printer 11. In a time 152, while still holding down the OnLine button, the FormFeed button and the Enter button on the control panel of printer 11, the user turns on printer 11. In a time 153, after printer 11 is turned on, the user releases the OnLine button, the FormFeed button and the Enter button. The user then presses and releases the FormFeed button. In a time 154, the user presses and releases the Enter button.

Printer service tool 10 emulates the button sequence shown in FIG. 13 when the user depresses directional arrow 28 (shown in FIG. 1) on printer service tool 10 and then turns on printer 11.

Figure 14:
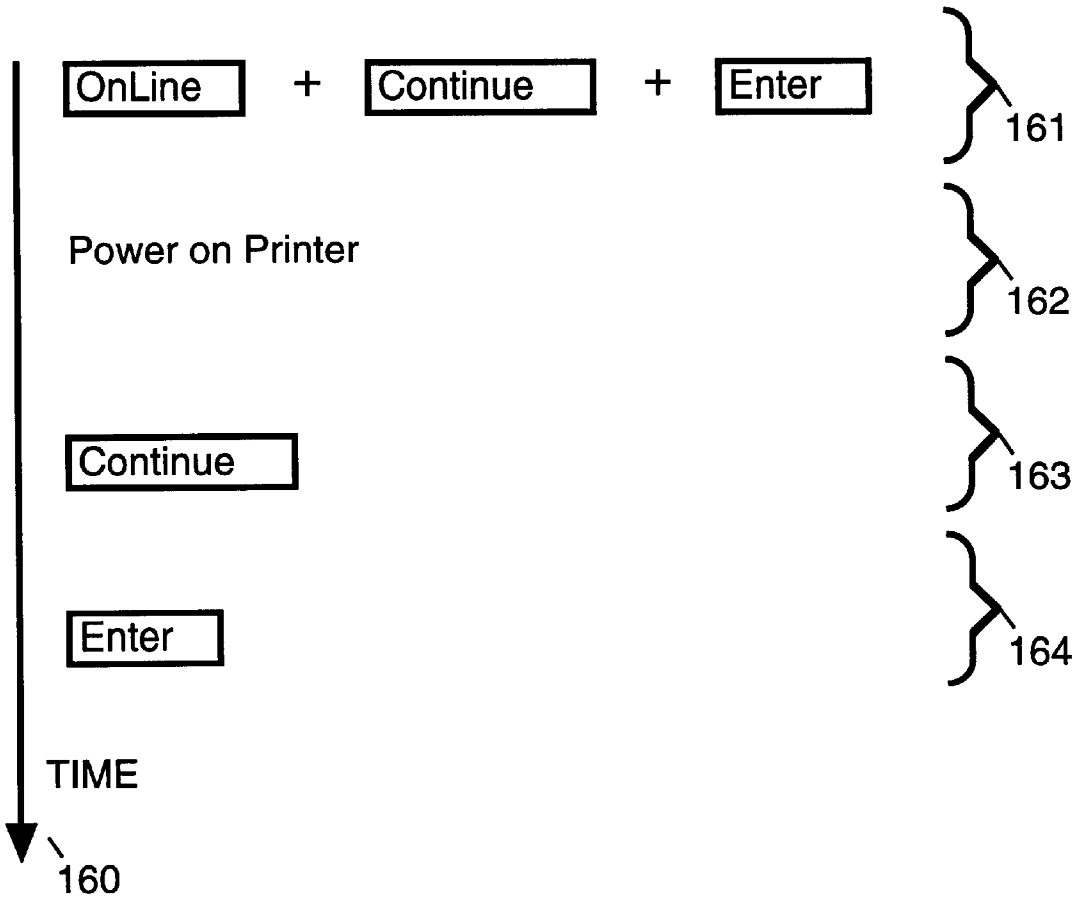
FIG. 14 shows the button sequence used to place a Hewlett-Packard 3Si laser printer into service mode.

FIG. 14 shows the button sequence used to place a Hewlett-Packard 3Si laser printer into service mode. Elapsing of time is represented by an arrow 160. Provided printer 11 is a Hewlett-Packard 3Si laser printer, the button sequence may be used to place printer 11 into service mode. In a time 161, before printer 11 is turned on, the user presses and holds the OnLine button, the Continue button and the Enter button on the control panel of printer 11. In a time 162, while still holding down the OnLine button, the Continue button and the Enter button on the control panel of printer 11, the user turns on printer 11. In a time 163, after printer 11 is turned on, the user releases the OnLine button, the Continue button and the Enter button. The user then presses and releases the Continue button. In a time 164, the user presses and releases the Enter button.

Printer service tool 10 emulates the button sequence shown in FIG. 14 when the user depresses directional arrow 30 (shown in FIG. 1) on printer service tool 10 and then turns on printer 11.

Figure 15:
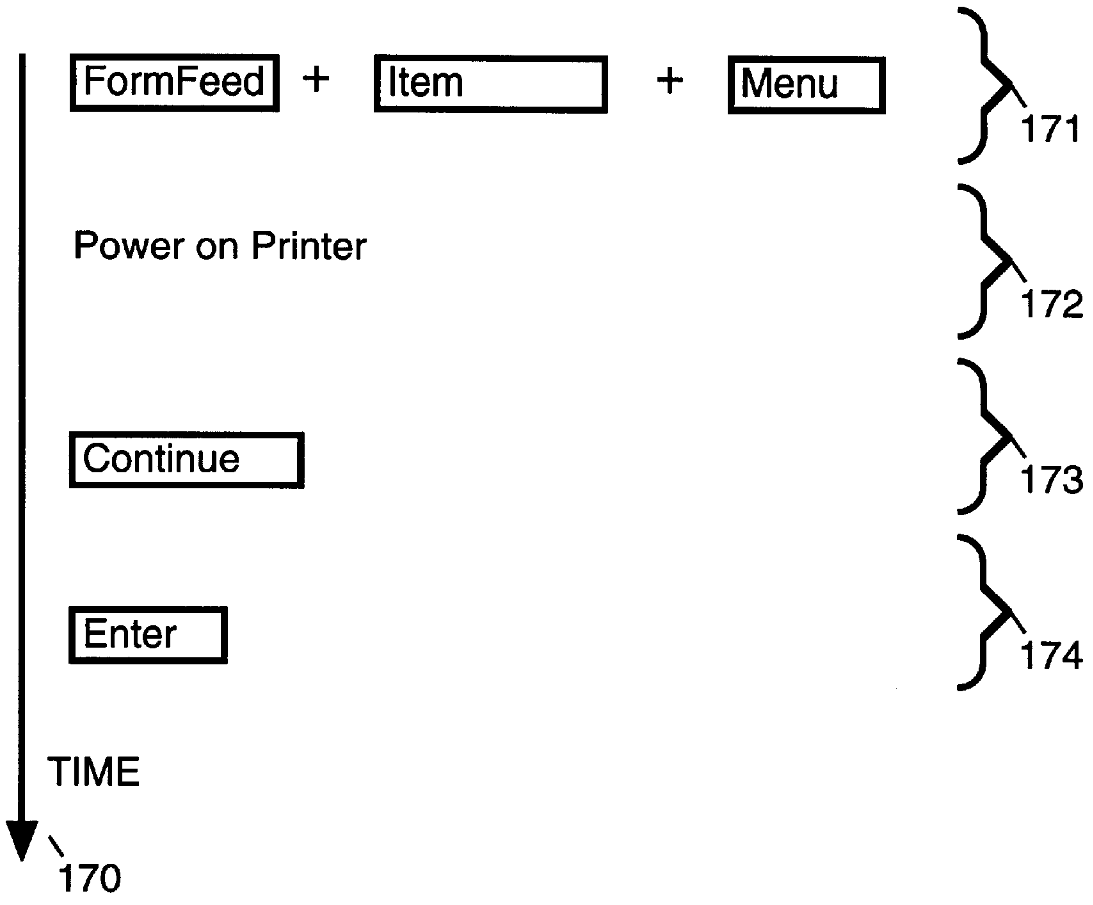
FIG. 15 shows the button sequence used to place a Hewlett-Packard 4Si laser printer into extended diagnostics mode.

FIG. 15 shows the button sequence used to place a Hewlett-Packard 4Si laser printer into extended diagnostics mode. Elapsing of time is represented by an arrow 170. Provided printer 11 is a Hewlett-Packard 4Si laser printer, the button sequence may be used to place printer 11 into extended diagnostics mode. In a time 171, before printer 11 is turned on, the user presses and holds the FormFeed button, the Item button and the Menu button on the control panel of printer 11. In a time 172, while still holding down the FormFeed button, the Item button and the Menu button on the control panel of printer 11, the user turns on printer 11. In a time 173, after printer 11 is turned on, the user releases the FormFeed button, the Item button and the Menu button. The user then presses and releases the Continue button. In a time 174, the user presses and releases the Enter button.

Printer service tool 10 emulates the button sequence shown in FIG. 14 when the user depresses directional arrow 27 (shown in FIG. 1) on printer service tool 10 and then turns on printer 11.

Figure 16:
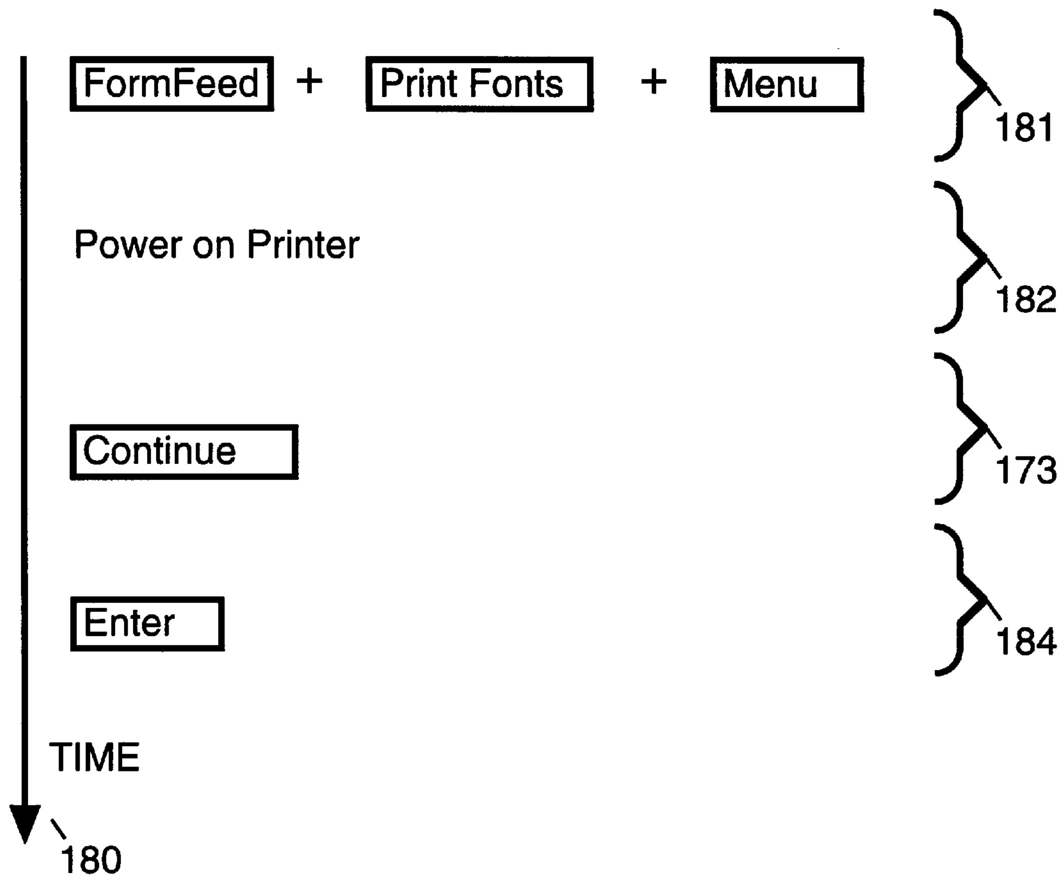
FIG. 16 shows the button sequence used to place a Hewlett-Packard 3Si laser printer into extended diagnostics mode.

FIG. 16 shows the button sequence used to place a Hewlett-Packard 3Si laser printer into extended diagnostics mode. Elapsing of time is represented by an arrow 180. Provided printer 11 is a Hewlett-Packard 3Si laser printer, the button sequence may be used to place printer 11 into extended diagnostics mode. In a time 181, before printer 11 is turned on, the user presses and holds the FormFeed button, the PrintFonts button and the Menu button on the control panel of printer 11. In a time 182, while still holding down the FormFeed button, the PrintFonts button and the Menu button on the control panel of printer 11, the user turns on printer 11. In a time 183, after printer 11 is turned on, the user releases the FormFeed button, the PrintFonts button and the Menu button. The user then presses and releases the Continue button. In a time 184, the user presses and releases the Enter button.

Printer service tool 10 emulates the button sequence shown in FIG. 16 when the user depresses directional arrow 29 (shown in FIG. 1) on printer service tool 10 and then turns on printer 11.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A printer service tool, comprising:

a control panel port connector for connecting to a control panel port of a printer;

a controller diagnostic port connector for connecting to a diagnostic port of the printer; and, a single display by which is displayed a plurality of menus, the plurality of menus including:

a first menu that includes a representation of buttons displayed on a control panel of the printer, the representation of buttons being displayed by the single display, and a second menu that includes menu items, the menu items providing ability to monitor printer functionality.

2. A printer service tool, as in claim 1 wherein the plurality of menus additionally comprises a third menu that includes a representation of buttons displayed on a control panel of a second type of printer, the second type of printer being of a different type than the printer from the control panel of which the first menu includes menu items.

3. A printer service tool, as in claim 1 wherein the second menu includes menu items from an engine test menu.

4. A printer service tool, as in claim 1 wherein the second menu includes menu items that allow selection of a paper path through the printer.

5. A printer service tool, as in claim 1 wherein the second menu includes an indication of the fuser temperature for the printer.

6. A printer service tool, as in claim 1, additionally comprising a port connector for connecting the printer service tool to an external computing device, the printer service tool transferring to the external computing device, through the port connector, service information obtained from the printer.

7. A printer service tool as in claim 1 wherein the first menu includes an explanation of any errors captured from the controller diagnostic port.

8. A method for providing service to a printer, the method comprising the following steps:

(a) connecting the printer to a printer service tool;

(b) selecting, by a user of the printer service tool, a first macro to be performed at start-up of the printer; and, (c) simulating, by the printer service tool upon the printer service tool detecting start-up of the printer, button presses on a control panel for the printer, including the following substeps:

(c.1) setting button values for the control panel, and (c.2) holding the button values for a predetermined amount of time.

9. A method as in claim 8 wherein in step (b) the first macro places the printer into a service mode.

10. A method as in claim 8 wherein in step (b) the first macro places the printer into an extended diagnostics mode.

11. A method by which a printer service tool provides service to a printer, the method comprising the following step:

(a) in response to a user of the printer service tool selecting a first macro to be performed at start-up of the printer, simulating, by the printer service tool upon the printer service tool detecting start-up of the printer, button presses on a control panel for the printer, including the following substeps:

(a.1) setting button values for the control panel, and (a.2) holding the button values for a predetermined amount of time.

12. A method as in claim 11 wherein in step (b) the first macro places the printer into a service mode.

13. A method as in claim 11 wherein in step (b) the first macro places the printer into an extended diagnostics mode.

14. A printer service tool, comprising:

a control panel port connector for connecting to the control panel port of a printer;

a controller diagnostic port connector for connecting to a diagnostic test port of the printer; and, a port connector for connecting the printer service tool to an external computing device so that the printer service tool is simultaneously connected to the printer and the external computing device, the printer service tool transferring to the external computing device, through the port connector, service information obtained from the printer;

wherein the control panel port and the diagnostic test port are separate printer ports which are not connected to each other during normal operation of the printer.

15. A printer service tool as in claim 14, additionally comprising:

software, running on the external computing device, the software receiving current contents of a control panel display of the printer 11 and displaying detailed information about any messages and errors indicated by the current contents of the control panel display.

16. A printer service tool as in claim 15 wherein the detailed information includes information about any failure in printer operation and includes a suggested fix.

17. A printer service tool as in claim 15 wherein the software includes a web browser to be used for updating the detailed information from a remote web site.

18. A method for providing service via a printer service tool, comprising the following steps:

(a) connecting the printer service tool to a printer including connecting the printer service tool to both a control panel port of the printer and connecting the printer service tool to a diagnostic test port of the printer, the control panel port and the diagnostic test port being two separate ports of the printer which are not connected to each other during normal operation of the printer;

(b) connecting to the printer service tool an external computing device, so that the printer service tool is simultaneously connected to the printer and the external computing device;

(c) obtaining, by the printer service tool from the printer, service information pertaining to the printer; and, (d) transferring, by the printer service tool to the external computing device, service information obtained from the printer.

19. A method as in claim 18 additionally comprising the following step:

(e) displaying, by the external computing device, detailed information about any messages and errors indicated by current contents of a control panel display of the printer, the current contents of the control panel display of the printer being included as part of the service information obtained from the printer in step (d).

20. A method as in claim 19 wherein in step (e) the detailed information includes information about any failure in printer operation and includes a suggested fix.

21. A printer service tool as in claim 19 additionally comprising the following step:

(f) updating the detailed information from a remote web site.

* * * * *